(12) United States Patent
Schini et al.

(10) Patent No.: US 10,289,133 B2
(45) Date of Patent: May 14, 2019

(54) METHOD FOR STARTING A FAN OPERATION TEST

(71) Applicant: Safran Aircraft Engines, Paris (FR)

(72) Inventors: Yannick Schini, Moissy-Cramayel (FR); Arnaud Rodhain, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 15/313,065

(22) PCT Filed: May 19, 2015

(86) PCT No.: PCT/FR2015/051308
§ 371 (c)(1),
(2) Date: Nov. 21, 2016

(87) PCT Pub. No.: WO2015/177454
PCT Pub. Date: Nov. 26, 2015

(65) Prior Publication Data
US 2017/0153656 A1    Jun. 1, 2017

(30) Foreign Application Priority Data
May 23, 2014  (FR) ...................................... 14 54703

(51) Int. Cl.
G05D 23/19   (2006.01)
G05B 19/048  (2006.01)
G07C 5/08    (2006.01)

(52) U.S. Cl.
CPC ....... G05D 23/1917 (2013.01); G05B 19/048 (2013.01); G07C 5/08 (2013.01);
(Continued)

(58) Field of Classification Search
CPC ......................... G05D 23/1917; G05B 19/048
(Continued)

(56) References Cited

U.S. PATENT DOCUMENTS

| 5,951,611 A * | 9/1999 | La Pierre | G05B 23/0232 701/32.1 |
| 2004/0151583 A1* | 8/2004 | Bettencourt, Jr. | F04D 29/362 416/1 |

(Continued)

FOREIGN PATENT DOCUMENTS

FR    2896013 A    7/2007

OTHER PUBLICATIONS

International Search Report and Written Opinion with English Language Translation, dated Aug. 25, 2015, PCT Application No. PCT/FR2015/051308.
(Continued)

*Primary Examiner* — Ricky Ngon
(74) *Attorney, Agent, or Firm* — Womble Bond Dickinson (US) LLP

(57) ABSTRACT

The present invention concerns a method for starting a test testing the operation of at least one fan designed to cool at least one computer of an aircraft turbojet engine, said method comprising steps of:—comparing (E1) the number of flights carried out by said aircraft since the last operation of the fan (N) with a first threshold (y),—comparing (E3) the number of flights carried out by said aircraft since the last operation of the fan (N) with a second threshold (x), said second threshold being greater than or equal to the first threshold,—acquiring an environmental parameter (T) and checking if the parameter satisfies a limit environmental condition of operation of the fan (E6),—controlling (E8) the starting of said fan operation test when the number of flights carried out by said aircraft since the last operation of the fan
(Continued)

(N) is greater than or equal to said first threshold (y), less than said second threshold (x) and when the acquired parameter (T) satisfies said limit environmental condition.

12 Claims, 4 Drawing Sheets

(52) U.S. Cl.
CPC ............. *G05B 2219/2614* (2013.01); *G05B 2219/31455* (2013.01)

(58) Field of Classification Search
USPC ....................................................... 702/108
See application file for complete search history.

(56) References Cited

U.S. PATENT DOCUMENTS

| | | | | |
|---|---|---|---|---|
| 2007/0156292 | A1* | 7/2007 | Frankel | F04D 27/004 700/300 |
| 2008/0238607 | A1* | 10/2008 | Schuricht | F01P 7/044 340/3.1 |
| 2011/0219862 | A1 | 9/2011 | Sand | |
| 2013/0340470 | A1* | 12/2013 | Piesker | F25B 39/02 62/515 |
| 2014/0208761 | A1* | 7/2014 | Skilton | B64D 33/08 60/772 |

OTHER PUBLICATIONS

French Search Report with English Language Translation Cover Sheet dated Jan. 15, 2015, Application No. PCT/FR2015/051308.
Written Opinion of International Searching Authority with English Language Translation dated Aug. 25, 2015, PCT Application No. PCT/FR2015/051308.

* cited by examiner

METHOD FOR STARTING A FAN OPERATION TEST

GENERAL TECHNICAL FEILD

The subject of the invention is cooling computers of a turbojet of an aircraft and more particularly a method of fan operation test ensuring such cooling.

STATE OF THE ART

Each turbojet of an aircraft comprises at least one computer, generally at least two, dedicated to the controlling of the turbojet and to analysis of proper operation of the latter. So it can stay in a temperature range enabling proper operation, such a computer sometimes needs active cooling, for example when the aircraft is operating in a hot atmosphere or in operating phases when idling or at low speed, such as long taxiing.

Such cooling can be ensured by one or more fans ("blower") used to blow external air on a heat dissipater conjoined with the computer.

According to the environmental conditions the aircraft goes through, these fans cannot be used for a relatively long period, for example during several successive flights. To ensure that a fan will work correctly when a computer needs active cooling, operation tests are conducted on these fans. During such a test, the operation of a fan is forced despite the absence of need for cooling to verify that the fan is not in malfunction and to limit the risk of dormant malfunction.

A test method currently being used comprises performing such an operating test on each flight. This ensures that the fan(s) are not malfunctioning.

But, such a test method means that the tested fan has to undergo an operating cycle on each flight of the aircraft and accelerates therefore wear on equipment, which shortens its service life. Also, when a test is initiated the aircraft can be in cold environmental conditions, especially in air at negative temperature. Fans have a limited operating range in temperature and have limited ability to blow very cold air. So operation of such a fan in cold atmosphere can cause degradation of equipment. Forced running of an operating test risks having the tested fan(s) function outside their operational range and have them malfunction.

There is a need for an operating test method to ensure proper availability of equipment and have minimal impact on its service life while limiting the probability of operation in environmental conditions risking causing equipment malfunction.

PRESENTATION OF THE INVENTION

According to a first aspect the present invention relates to a method for starting an operating test of at least one fan adapted to cool at least one computer of a turbojet of an aircraft, said method comprising the following steps performed by a data-processing module:
  comparison of the number of flights made by said aircraft since the most recent operation of the fan to a first threshold,
  comparison of the number of flights made by said aircraft since the most recent operation of the fan to a second threshold, said second threshold being greater than or equal to the first threshold,
  acquisition of an environmental parameter and verification of the satisfaction of the parameter with a boundary environmental condition of operation of the fan,
  control of the starting of said operating test of the fan when the number of flights made by said aircraft since the most recent operation of the fan is greater than or equal to said first threshold, less than said second threshold and when the acquired parameter verifies said boundary environmental condition.

Such a test method tests proper operation of the fans regularly but not necessarily on each flight, and this extends their service life. This method also avoids conducting a test in environmental conditions likely to degrade fans provided a number of flights making a test obligatory has not been reached.

The processing module can further control the starting of said operating test of the fan when the number of flights made by said aircraft since the most recent operation of the fan is greater than or equal to the second threshold.

This forces conducting a test from a certain number of successive flights without test, irrespective of the environmental conditions at the time this forced test is run.

The environmental parameter can comprise a temperature, a humidity rate or an air contamination rate.

Said method according to the first aspect delays conducting the operating test when the ambient temperature is for example negative or even though the air is too humid or contaminated, such environmental conditions risk degrading the fans.

The second threshold can be representative of the maximal authorized number of flights without conducting a test so as to satisfy the requisites for tolerated malfunction rates.

This limits the frequency of malfunctions of the active cooling system causing delays and flight cancellations by testing proper operation of the fans at least when the number of successive flights without test reaches this second threshold.

The second threshold can be a function of the reliability and number of tolerable malfunctions attributed to the fan.

This keeps the fail rate of the fan below an acceptable maximal value.

In a first alternative embodiment, the first threshold is equal to 0.

Such adjusting of the first threshold minimizes the probability of conducting a test in environmental conditions likely to degrade the fan.

In a second alternative embodiment, the first threshold is equal to the second threshold.

Such a second variant minimizes the number of operating cycles of the fan, a test being conducted when the number of flights without test reaches the second threshold, irrespective of the environmental conditions.

In a third alternative embodiment, the first threshold is determined so as to minimize the number of tests conducted while limiting operation of the fan outside a boundary condition.

The choice of an intermediary value for the first threshold between zero and the second threshold finds an optimal compromise between minimization of the number of cycles and reduction of the probability of operation in environmental conditions likely to degrade the fan.

According to a second aspect, the invention relates to a computer program product comprising code instructions for execution of a method for starting an operating test of at least one fan according to the first aspect when this program is executed by a processor.

According to a third aspect, the invention relates to a data-processing module intended for a cooling system of at least one computer of a turbojet of an aircraft and configured to:

compare the number of flights made by said aircraft since the most recent operation of at least one fan of said cooling system to a first threshold, compare the number of flights made by said aircraft since the most recent operation of the fan to a second threshold, said second threshold being greater than or equal to the first threshold, acquire an environmental parameter and verify satisfaction of the parameter with a boundary environmental condition of operation of the fan, control starting of said operating test of the fan when the number of flights made by said aircraft since the most recent operation of the fan is greater than or equal to said first threshold, less than said second threshold and when the acquired parameter verifies said boundary environmental condition.

Such computer program product and processing module have the same advantages as those mentioned for the method according to the first aspect.

According to a fourth aspect, the invention relates to a cooling system of at least two computers of a turbojet of an aircraft comprising at least two fans, an aircraft computer and said at least two computers of the turbojet, each of the computers of the turbojet comprising a data-processing module according to the third aspect and being configured, when its data-processing module controls the starting of the operation test of the fans, to control the aircraft computer by activation of all said fans by means of the avionics network.

Such an arrangement lets the operating test of all the fans be piloted by a single computer of the engine, without need for intervention by the other computer of the engine.

According to a fifth aspect, the invention relates to a cooling system of at least two computers of a turbojet comprising at least two fans and said at least two computers of the turbojet, each of the computers of the turbojet comprising a data-processing module according to the third aspect and being configured to actuate a fan when its data-processing module controls the starting of the fan operation test.

Such an arrangement enables different test logic, for example different thresholds, for each of the fans.

PRESENTATION OF THE FIGURES

Other characteristics and advantages of the present invention will emerge from the following description of an embodiment of the invention. This description will be given in reference to the appended drawings, wherein.

DETAILED DESCRIPTION

Figure 1:
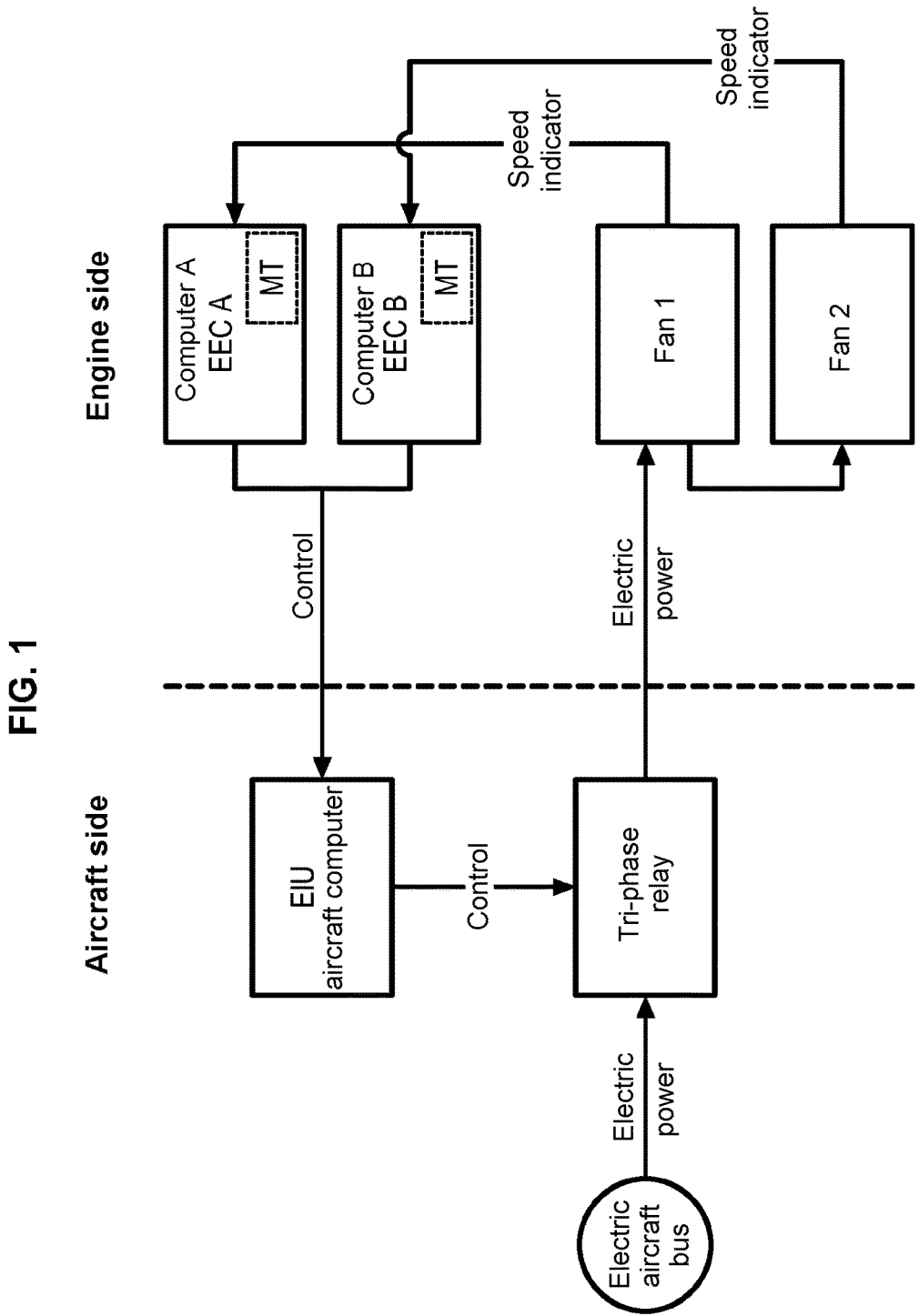
FIG. 1 illustrates a cooling system of at least one computer of a turbojet of an aircraft according to a first embodiment of the invention.
Figure 2:
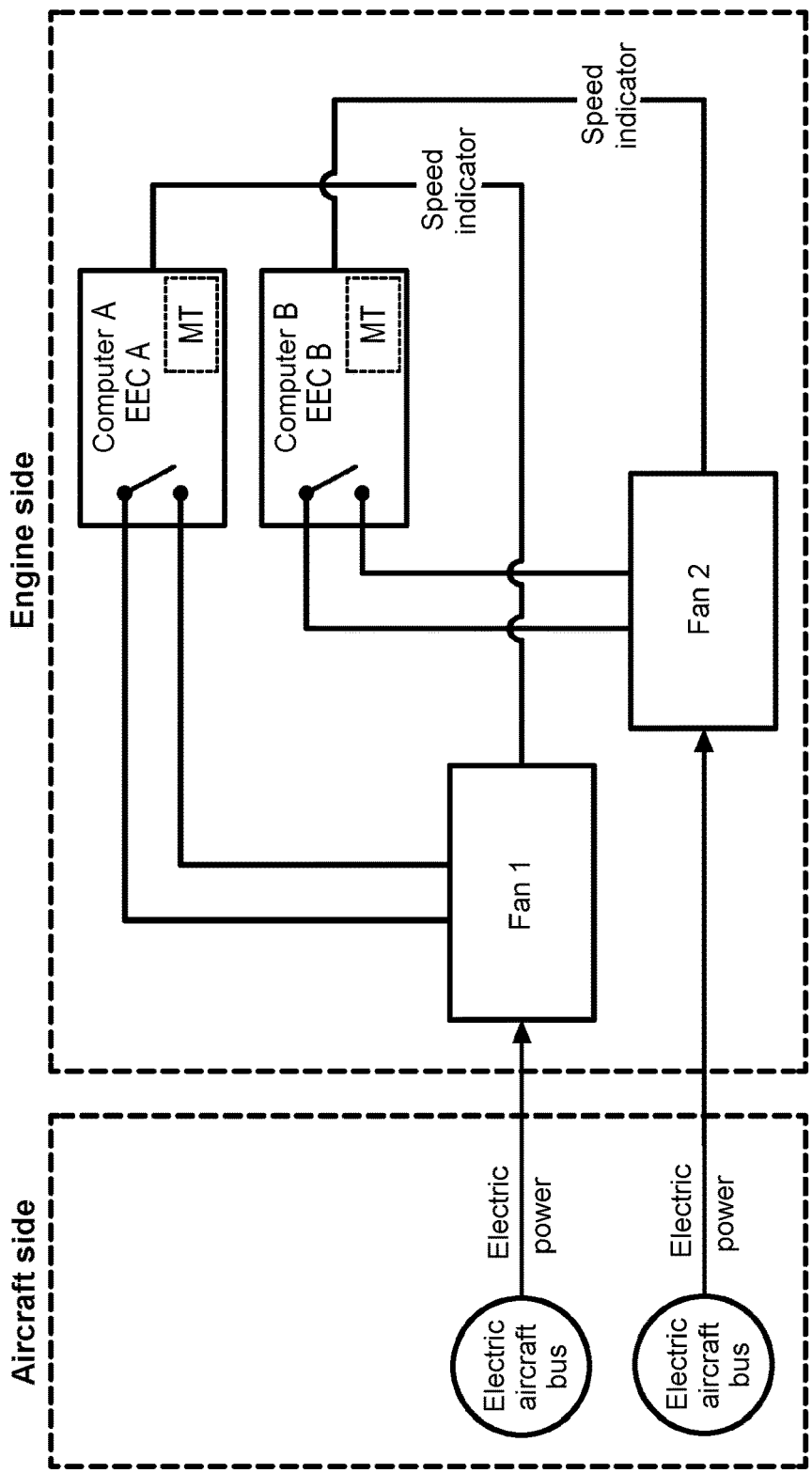
FIG. 2 illustrates a cooling system of at least one computer of a turbojet of an aircraft according to a second embodiment of the invention.

In reference to FIGS. 1 and 2 an embodiment of the invention relates to a cooling system of at least one computer of a turbojet of an aircraft, said cooling system comprising said at least one computer, at least one fan and at least one data-processing module MT.

Said computer can be an EEC ("electronic engine controller") computer of the FADEC of the aircraft, dedicated to controlling the turbojet and to analysis of its operation. To evacuate heat produced by the computer circuits, the latter can be contained in a casing having a heat dissipater, for example in the form of cooling fins. Said at least one fan of the cooling system is arranged to blow on this dissipater air from the external atmosphere to ensure cooling of the computer.

According to an embodiment the computer is called double skin and the dissipater of the casing is surmounted by a plate for conveying the flow of air blown by the at least one fan via the dissipater.

The at least one fan can be an electric fan fed by the electric network of the aircraft. Said fan is adapted to provide the computer with a speed indicator signal indicating its rotating, for example in the form of a Boolean.

The at least one data-processing module MT has a memory, calculation means and is connected to the at least one fan to receive the signal indicating operation of the latter. Such a processing module can be integrated into the at least one computer of the turbojet.

In an embodiment shown in FIGS. 1 and 2, the cooling system can comprise at least two fans and at least two computers so as to ensure redundancy of the calculation means and their cooling for more operating safety. Each computer can comprise its own processing module.

Figure 3:
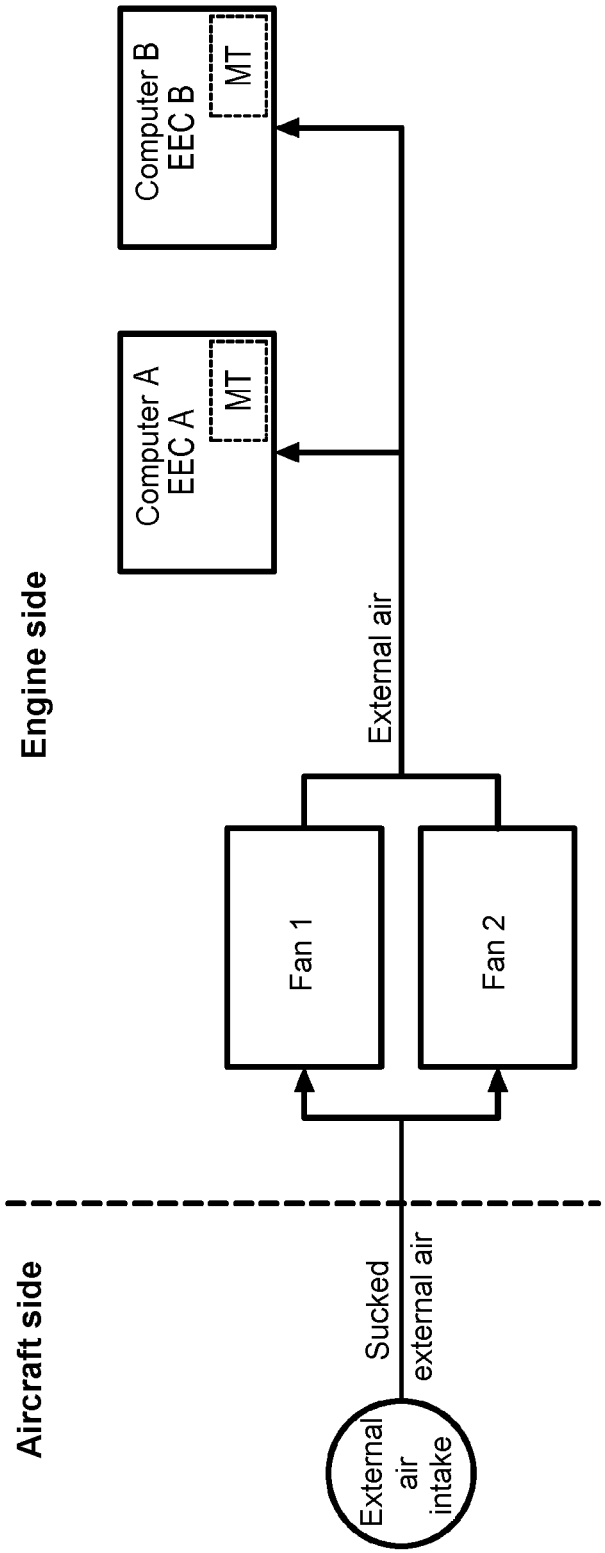
FIG. 3 illustrates an air circuit of a cooling system of at least one computer of a turbojet of an aircraft according to an embodiment of the invention.

The air circuit shown in FIG. 3 comprises a common external air intake by which the fans suck in external air. The fans then ventilate this external air to the at least two computers by means of a common conduit. In this way, a single fan can be enough to cool two computers. Advantageously, each fan is designed to ensure a total air rate sufficient for cooling all the computers.

In a first alternative embodiment illustrated in FIG. 1, each of the computers is configured to control activation of all said fans by means of the avionics network (ARINC) when its data-processing module controls starting of a fan operation test. For this to happen as shown in FIG. 1, the computer or each of the computers (EEC) can be connected by means of the avionics network to a computer located in the aircraft, for example an EIU ("Engine Interface Unit") or a DPC ("Digital Processing Computer"), configured to control a tri-phase relay acting as interrupter between the two fans and the power network of the aircraft.

In a second alternative embodiment illustrated in FIG. 2, each computer is configured to control activation of a single fan when its data-processing module controls starting of the fan operation test. For this to happen, each computer is connected to the power supply of a fan and acts on an interrupter to feed the fan or not and accordingly control its operation or not.

To determine whether an operating test of at least one fan belonging to the cooling system of at least one computer of a turbojet must be conducted, the processing module verifies that the number of flights made by said aircraft since the most recent operation of the fan is greater than or equal to a first threshold, less than a second threshold and an environmental parameter it has acquired satisfies a boundary environmental condition for operating the fan.

Figure 4:
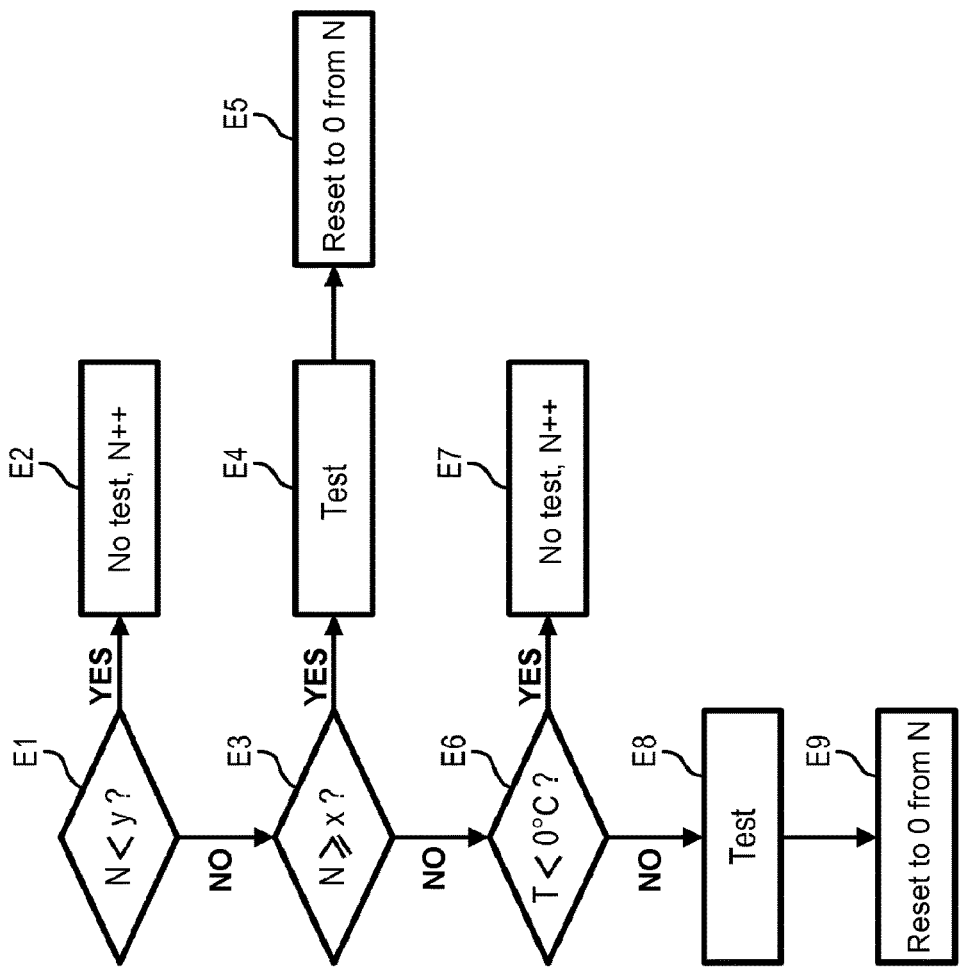
FIG. 4 illustrates a diagram showing an implementation of a method for starting an operating test of at least one fan according to the invention.

More precisely, and in reference to FIG. 4 illustrating an implementation of the method according to the invention, in a first comparison step E1 the data-processing module compares the number of flights made by said aircraft since the most recent operation of the fan N to a first threshold y. This first threshold y thus corresponds to the number of flights from which a fan operation test can be conducted.

If the number of flights made by said aircraft since the most recent operation of the fan N is less than this first threshold y, the processing module does not control starting of a test in a second step without test E2. This means not performing a test on each flight while limiting the number of operating cycles for fans to preserve their service life.

If the number of flights made by said aircraft since the most recent operation of the fan N is greater than or equal to the first threshold y, in a third comparison step E3, the data-processing module compares the number of flights made by said aircraft since the most recent operation of the fan to a second threshold x, the second threshold being greater than or equal to the first threshold y.

If the number of flights made by said aircraft since the most recent operation of the fan N is greater than or equal to this second threshold x, the processing module controls starting the fan operation test during a fourth test step E4. This second threshold x is representative of the maximum number of flights authorized without performing a test to satisfy requisites of tolerated malfunction rates of the cooling system. Over and above this second threshold, the test must be run to ensure a malfunction rate less than the tolerated rate of malfunctions. Once the fans have been tested, the number of flight run by said aircraft since the most recent operation of the fan is reset to 0 during a fifth resetting step E5. So a fan test can then be conducted only after y additional flights without test, avoiding repeated operation of fans and their wear. The second threshold x can be determined from the rate of reliability required of the fan. It can also be determined from the rate of delay and cancellation of flights attributed to the fan by the aircraft manufacturer. This rate of delay and cancellation corresponds to the proportion of flights being delayed or cancelled due to a fan problem on all flights made.

If the number of flights made by said aircraft since the most recent operation of the fan N is under the second threshold x during the third step E3, the data-processing module acquires an environmental parameter T.

This environmental parameter T can for example be a temperature, a humidity rate, an air contamination rate. This environmental parameter can be measured by means of sensors located on the computers or connected to them. During a sixth verification step E6 the processing module verifies that the measured parameter satisfies a boundary environmental condition of operation of the fan. The processing module can verify for example that the temperature of fans does not drop below a certain limit temperature required by specifications. Specifications can require that fans do not operate below 0 degrees, or −5 or −10 degrees by way of example, as fans are sensitive to ice and frost. In fact below a certain temperature, the bearing grease in fans can freeze and prevent the engine from rotating the fan, causing a malfunction of the computer(s). This verification step E6 avoids performing tests outside specification and therefore damaging the fans. So if the environmental parameter fails to satisfy said boundary environmental condition from the point of view of operation of the fan, for example if the temperature is under 0, the data-processing module does not control starting of the operation test of the fans during a seventh step without test E7.

However when the number of flights made by said aircraft since the most recent operation of the fan N is greater than or equal to said first threshold y, less than said second threshold x and when the acquired parameter T verifies said boundary environmental condition, the data-processing module controls the starting of said fan operation test during an eighth test step E8.

The number of operating cycles due to fan tests is reduced, boosting their service life and regularly testing proper operation of the fans. Also, the probability of conducting a test in outside specification condition is reduced. No test in outside specification condition is in fact conducted provided the number of flights made by said aircraft since the most recent operation of the fan N is less than x flights.

Once the fans have been tested, the number of flights made by said aircraft since the most recent operation of the fan N is reset to 0 during a ninth resetting step E9. A fan test can then be run only after minimum y flights, avoiding repeated operation of fans and their degradation.

With each operation of the fans, the number of flights made by said aircraft since the most recent operation of the fan N can also be reset to 0. In fact during operation of fans, the computers verify good reception of a signal indicating the operation of the fans and detect any malfunctions of the latter, performing the equivalent of an operating test of these fans.

The first threshold y and the second threshold x can be parameterized as a function of the aims targeted by a user of the system or by self-learning.

To limit the number of operating cycles of fans and prolong their service life to a maximum, the first threshold y can be fixed at the same value as the second threshold x. A test is run every x flights only, i.e., when the number of flights made without a test being run becomes critical from the point of view of the tolerated rate of malfunction. By contrast, to limit the operation of fans in outside specification conditions to a maximum, for example in cold conditions, the first threshold y can be fixed at 0. A test can be conducted as soon as the conditions verifying the specifications are attained, optionally on each flight.

Finally, it is also possible to fix the first threshold y at an intermediate value to minimize the number of tests conducted while limiting operation of the fan outside boundary condition. This first optimal threshold can be obtained by self-learning. It can also be obtained by taking an average of test intervals of different turbojets having shown an acceptable service life.

This solution can be used for all engines and equipment needing an operating test to be run and which can be subject to environmental restrictions risking causing malfunction of this equipment or these engines. This solution can be applied quite particularly to fans of LEAP-1A ("Leading—Edge Aviation Propulsion"), LEAP-1B and LEAP-1C engines.

The invention claimed is:

1. A method for starting an operating test of at least one fan adapted to cool at least one computer of a turbojet of an aircraft,
said method comprising the following steps performed by a data-processing module:
comparison of the number of flights made by said aircraft since the most recent operation of the fan to a first threshold,
comparison of the number of flights made by said aircraft since the most recent operation of the fan to a second threshold, said second threshold being greater than or equal to the first threshold,
acquisition of an environmental parameter and verification that the environmental parameter is within a predetermined range of a boundary environmental condition of operation of the fan, starting of said fan when the number of flights made by said aircraft since the most recent operation of the fan is greater than or equal to said first threshold, less than said second threshold and when the acquired environmental parameter is within said predetermined range.

2. The method according to claim 1, wherein the fan is started when the number of flights made by said aircraft since the most recent operation of the fan is greater than or equal to the second threshold.

3. The method according to claim 1, wherein the environmental parameter comprises a temperature, a humidity rate or an air contamination rate.

4. The method according to claim 1, wherein the second threshold is representative of the maximum number of flights authorized without performing a test to satisfy requisites of tolerated malfunction rates.

5. The method according to claim 1, wherein the second threshold is a function of the reliability and number of tolerable malfunctions attributed to the fan.

6. The method according to claim 1, wherein the first threshold is equal to 0.

7. The method according to claim 1, wherein the first threshold is equal to the second threshold.

8. The method according to claim 1, wherein the first threshold is determined so as to minimize the number of tests conducted while limiting operation of the fan outside a boundary condition.

9. A non-transitory computer readable medium comprising computer instructions stored therein for causing a computer processor to perform the steps of starting an operating test of at least one fan, according to claim 1.

10. A data-processing-module intended for a cooling system of at least one computer of a turbojet of an aircraft and configured to:

compare the number of flights made by said aircraft since the most recent operation of at least one fan of said cooling system to a first threshold, compare the number of flights made by said aircraft since the most recent operation of the fan to a second threshold, said second threshold being greater than or equal to the first threshold, acquire an environmental parameter and verify that the environmental parameter is within a predetermined range of a boundary environmental condition of operation of the fan, start the fan when the number of flights made by said aircraft since the most recent operation of the fan is greater than or equal to said first threshold, less than said second threshold and when the acquired environmental parameter within said predetermined range.

11. A cooling system of at least two computers of a turbojet of an aircraft comprising at least two fans, an aircraft computer and said at least two computers of the turbojet, each of the computers of the turbojet comprising a data-processing module, according to claim 10 and being configured, when its data-processing module controls the starting of the operation test of the fans, to control the aircraft computer by activation of all said fans by means of the avionics network.

12. A cooling system of at least two computers of a turbojet comprising at least two fans and said at least two computers of the turbojet, each of the computers of the turbojet comprising a data-processing module according to claim 10 and being configured to actuate a fan when its data-processing module controls the starting of the fan operation test.

* * * * *